(12) United States Patent
Garrison

(10) Patent No.: US 10,948,014 B2
(45) Date of Patent: *Mar. 16, 2021

(54) INTERSHAFT SEAL ASSEMBLY WITH MULTI-AXIS STEPPED GROOVES

(71) Applicant: Stein Seal Company, Kulpsville, PA (US)

(72) Inventor: Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 346 days.

This patent is subject to a terminal disclaimer.

(21) Appl. No.: 16/167,708

(22) Filed: Oct. 23, 2018

(65) Prior Publication Data

US 2019/0048931 A1 Feb. 14, 2019

Related U.S. Application Data

(63) Continuation-in-part of application No. 16/030,927, filed on Jul. 10, 2018, which is a continuation-in-part
(Continued)

(51) Int. Cl.
*F16C 32/06* (2006.01)
*F01D 11/04* (2006.01)
(Continued)

(52) U.S. Cl.
CPC .......... *F16C 32/0662* (2013.01); *F01D 11/04* (2013.01); *F01D 25/22* (2013.01);
(Continued)

(58) Field of Classification Search
CPC .. F16J 15/16; F16J 15/24; F16J 15/441; F16J 15/442; F16J 15/44; F16J 15/40;
(Continued)

(56) References Cited

U.S. PATENT DOCUMENTS 4,212,475 A 7/1980 Sedy
5,090,712 A 2/1992 Pecht et al.
(Continued)

FOREIGN PATENT DOCUMENTS

KR 1020120043504 A 5/2012
KR 1020160065127 A 6/2016

OTHER PUBLICATIONS

International Search Report for PCT/US2019/040807 by the Korean Intellectual Property Office; dated Oct. 22, 2019; 4 pages.
(Continued)

*Primary Examiner* — Vishal A Patel
(74) *Attorney, Agent, or Firm* — Michael Crilly, Esquire

(57) ABSTRACT

An intershaft seal assembly for maintaining separation between a piston ring and a pair of mating rings is presented. The assembly includes a piston ring interposed between forward and aft mating rings and a plurality of hydrodynamic grooves disposed along a sealing face of each mating ring. Each hydrodynamic groove further includes at least two adjoining steps wherein each step is defined by a base wall arranged to decrease depthwise in the direction opposite to rotation of an inner shaft. Two adjoining base walls define a base shoulder which locally redirects potion of a longitudinal flow within the groove to form an outward flow in the direction of the piston ring. Base walls are bounded by and intersect a pair of side walls with at least one side shoulder thereon which narrows the groove widthwise and locally redirects portion of the longitudinal flow to form a lateral flow from one side wall toward another side wall. Outward and lateral flows cooperate, with or without the longitudinal flow, to increase fluid pressure and maintain separation between the piston ring and the mating rings.

49 Claims, 12 Drawing Sheets

Related U.S. Application Data of application No. 15/899,813, filed on Feb. 20, 2018, now Pat. No. 10,648,507, which is a continuation of application No. 14/845,947, filed on Sep. 4, 2015, now Pat. No. 9,970,482, which is a continuation-in-part of application No. 14/396,101, filed as application No. PCT/US2014/033736 on Apr. 11, 2014, now Pat. No. 9,194,424.

(60) Provisional application No. 61/811,900, filed on Apr. 15, 2013.

(51) Int. Cl.
*F01D 25/22* (2006.01)
*F16J 15/44* (2006.01)
*F16J 15/40* (2006.01)

(52) U.S. Cl.
CPC ...... *F16C 32/0607* (2013.01); *F16C 32/0625* (2013.01); *F16J 15/40* (2013.01); *F16J 15/441* (2013.01); *F16J 15/442* (2013.01); *F05D 2250/23* (2013.01); *F05D 2250/25* (2013.01); *F05D 2250/292* (2013.01); *F05D 2250/75* (2013.01); *F16C 2360/23* (2013.01)

(58) Field of Classification Search
CPC .. F16C 32/0625; F16C 32/0607; F01D 11/04; F01D 25/22
See application file for complete search history.

(56) References Cited

U.S. PATENT DOCUMENTS

| | | | |
|---|---|---|---|
| 5,441,283 A | 8/1995 | Pecht et al. | |
| 5,447,316 A | 9/1995 | Matsui | |
| 5,529,317 A * | 6/1996 | Muller | F16J 15/3404 277/400 |
| 5,605,339 A * | 2/1997 | Pecht | F16J 15/3412 277/400 |
| 6,142,478 A | 11/2000 | Pecht et al. | |
| 6,425,583 B1 | 7/2002 | Muraki | |
| 6,726,213 B2 | 4/2004 | Wang | |
| 7,044,470 B2 * | 5/2006 | Zheng | F16J 15/342 277/400 |
| 7,744,094 B2 | 6/2010 | Yanagisawa et al. | |
| 8,408,555 B2 | 4/2013 | Garrison | |
| 8,888,104 B2 | 11/2014 | Garrison | |
| 9,039,013 B2 | 5/2015 | Artiles et al. | |
| 9,062,775 B2 | 6/2015 | Short et al. | |
| 2007/0296156 A1 * | 12/2007 | Yanagisawa | F16J 15/3412 277/352 |
| 2008/0284105 A1 | 11/2008 | Vasagar et al. | |
| 2010/0164180 A1 | 7/2010 | Short | |
| 2012/0217703 A1 | 8/2012 | Garrison | |
| 2015/0049968 A1 | 2/2015 | Garrison | |
| 2016/0169394 A1 | 6/2016 | Ranz et al. | |
| 2017/0051834 A1 | 2/2017 | Webster et al. | |
| 2018/0180096 A1 | 6/2018 | Garrison | |

OTHER PUBLICATIONS

Written Opinion for PCT/US2019/040807 by the Korean Intellectual Property Office; completed Oct. 21, 2019; 6 pages.

* cited by examiner

INTERSHAFT SEAL ASSEMBLY WITH MULTI-AXIS STEPPED GROOVES

CROSS REFERENCE TO RELATED APPLICATIONS

This application is a continuation-in-part of U.S. patent application Ser. No. 16/030,927 filed Jul. 10, 2018 entitled Circumferential Seal with Bifurcated Flow along Multi-Axis Stepped Grooves;

which is a continuation-in-part of U.S. patent application Ser. No. 15/899,813 filed Feb. 20, 2018 entitled Circumferential Back-to-Back Seal Assembly with Bifurcated Flow;

which is a continuation of U.S. patent application Ser. No. 14/845,947 filed Sep. 4, 2015 now U.S. Pat. No. 9,970,482 entitled Circumferential Back-to-Back Seal Assembly with Bifurcated Flow;

which is a continuation-in-part of U.S. patent application Ser. No. 14/396,101 filed Oct. 22, 2014 now U.S. Pat. No. 9,194,424 entitled Circumferential Back-to-Back Seal Assembly with Bifurcated Flow;

which is a National Phase of PCT Application No. PCT/US2014/033736 filed Apr. 11, 2014 entitled Circumferential Back-to-Back Seal Assembly with Bifurcated Flow;

which further claims priority from U.S. Provisional Application No. 61/811,900 filed Apr. 15, 2013 entitled Circumferential Back-to-Back Seal Assembly with Bifurcated Flow.

The subject matters of the prior applications are incorporated in their entirety herein by reference thereto.

FEDERALLY SPONSORED RESEARCH AND DEVELOPMENT

None.

BACKGROUND OF THE INVENTION

1. Field of the Invention

The invention generally relates to an intershaft sealing assembly for use within a gas turbine engine and more particularly is concerned, for example, with a piston ring axially disposed between a pair of mating rings rotatable with an inner shaft and radially disposed between a rotatable outer shaft and the rotatable inner shaft wherein the piston ring rotates with the rotatable outer shaft. Specifically, the sealing face of each mating ring includes a plurality of groove structures featuring stepped side walls and stepped bottom walls which cooperate to communicate a fluid onto the piston ring thereby minimizing contact between the piston ring and the mating rings during operation of the inner and outer shafts.

2. Background

Intershaft seal systems including hydrodynamic grooves are known within the seal art.

In one example, Garrison in U.S. Pat. Nos. 8,408,555 and 8,888,104, both entitled Intershaft Seal System for Minimizing Pressure Induced Twist, describes an intershaft seal system for communicating a balanced, uniform pressure profile onto forward and aft faces along a piston ring disposed between forward and aft mating rings. Each mating ring further includes a plurality of divergent flow grooves wherein each divergent flow groove further includes a pair of hydrodynamic grooves which intersect at an apex. A fluid originating from a high pressure region is directed through the piston ring and onto the divergent flow grooves. The fluid is then separated so that a portion of the total flow enters each groove and thereafter is directed onto the piston ring.

In another example, Pecht et al. in U.S. Pat. Nos. 5,441,283 and 5,605,339, both entitled Non-Contacting Mechanical Face Seal, describes spiral grooves including a plurality of terminal corners with varying depths which separate and then direct a fluid onto a sealing ring.

Although the grooves of both Garrison and Pecht et al. are capable of reducing twist-related contact and wear along a piston ring via communication of a substantially symmetric pressure force along the radial width of the piston ring, the tradeoff is often a lower overall pressure along the interfaces between piston ring and mating rings. The end results are larger axial translations by the piston ring with respect to the mating rings and greater likelihood of translation-related contact and wear between the piston ring and the mating rings.

As is readily apparent from the discussions above, the related arts have yet to fully realize the advantages of hydrodynamic grooves as applied to the task of balancing a piston ring between a pair of mating rings for the purpose of properly sealing the interface between a rotatable outer shaft and a rotatable inner shaft.

Accordingly, what is required is an intershaft seal which minimizes contact between a piston ring and a pair of mating rings via pressure forces communicated onto both faces of the piston ring via a plurality of hydrodynamic grooves so as to reduce contact-induced wear resulting from both twist and axial translation of the piston ring.

SUMMARY OF THE INVENTION

An object of the invention is to provide an intershaft seal which minimizes contact between a piston ring and a pair of mating rings via pressure forces communicated onto both faces of the piston ring via a plurality of hydrodynamic grooves so as to reduce contact-induced wear resulting from both twist and axial translation of the piston ring.

In accordance with some embodiments, the intershaft seal assembly includes a piston ring disposed between forward and aft mating rings and a plurality of hydrodynamic grooves disposed along a sealing face of each of the forward and aft mating rings. The intershaft seal assembly is interposed between outer and inner shafts for sealing between a higher pressure side and a lower pressure side. The piston ring is rotatable with the outer shaft. Both forward and aft mating rings are rotatable with the inner shaft. A feed groove is biased toward the inner shaft and directs a fluid into the hydrodynamic groove. The hydrodynamic groove includes at least two adjoining steps wherein each step is defined by a base wall. The base walls are arranged along the hydrodynamic groove to decrease depthwise in the direction opposite to rotation of the inner shaft. Two adjoining base walls are disposed about a base shoulder. Each base shoulder locally redirects a longitudinal flow within the hydrodynamic groove to form an outward flow in the direction of the piston ring. The base walls are bounded by and intersect a pair of side walls. Each side wall includes at least one side shoulder which narrows the hydrodynamic groove widthwise and locally redirects the longitudinal flow away from the side wall to form a lateral flow in the direction of another side wall.

In accordance with some embodiments, two side shoulders interest one base shoulder so that the side shoulders are disposed in an opposed arrangement. The outward flow(s)

and the lateral flows cooperate to maintain separation between the piston ring and each of the forward mating ring and the aft mating ring.

In accordance with other embodiments, two side shoulders are offset from one base shoulder so that the side shoulders are disposed in an opposed arrangement. The outward flow(s) and the lateral flows cooperate to maintain separation between the piston ring and each of the forward mating ring and the aft mating ring.

In accordance with other embodiments, two side shoulders are offset from one base shoulder so that the side shoulders are disposed in an offset arrangement. The outward flow(s) and the lateral flows cooperate to maintain separation between the piston ring and each of the forward mating ring and the aft mating ring.

In accordance with other embodiments, one side shoulder intersects one base shoulder and another side shoulder is disposed in an offset arrangement with respect to the side shoulder which intersects the base shoulder. The outward flow(s) and the lateral flows cooperate to maintain separation between the piston ring and each of the forward mating ring and the aft mating ring.

In accordance with other embodiments, two side shoulders are disposed about a base shoulder and arranged in an offset arrangement. The outward flow(s) and the lateral flows cooperate to maintain separation between the piston ring and each of the forward mating ring and the aft mating ring.

In accordance with other embodiments, a depth of each of two side shoulders are equal.

In accordance with other embodiments, a depth of each of two side shoulders differ.

In accordance with other embodiments, a depth of each of one side shoulder and one base shoulder differ.

In accordance with other embodiments, a depth of each of one side shoulder and one base shoulder are equal.

In accordance with other embodiments, at least one base wall is tapered.

In accordance with other embodiments, at least one side wall is tapered.

In accordance with other embodiments, the base walls and the side walls are tapered.

In accordance with method embodiments, a method for forming a thin film between a piston ring of an intershaft sealing assembly and a sealing face along each of a forward mating ring and an aft mating ring includes the steps of communicating a source flow into a feed groove communicable with a hydrodynamic groove, establishing a longitudinal flow along the hydrodynamic groove after the source flow enters the hydrodynamic groove, redirecting a first portion of the longitudinal flow via interaction with a base shoulder interposed between a pair of base walls to form an outward flow adjacent to the base shoulder, and redirecting a second portion of the longitudinal flow via interaction with a side shoulder along at least one side wall to form a lateral flow in the direction of another side wall. The base walls are interposed between a pair of side walls. The base walls are arranged along the hydrodynamic groove to decrease depthwise downstream from the feed groove. The lateral flow and the outward flow are perpendicularly disposed to one another and to the longitudinal flow. The outward flow and the lateral flow cooperate to maintain separation between the piston ring and each of the forward mating ring and the aft mating ring.

In accordance with other method embodiments, the method further includes the step of converging at least one lateral flow with the outward flow when at least one side shoulder intersects the base shoulder wherein the side shoulder(s) and the base shoulder are aligned along a plane that intersects the hydrodynamic groove. The converging step enhances stiffness of the thin film.

In accordance with other method embodiments, at least one lateral flow is formed downstream from the outward flow.

In accordance with other method embodiments, at least one lateral flow is formed upstream from the outward flow.

In accordance with other method embodiments, the method further includes the step of converging the lateral flow from one side wall with another lateral flow from another side wall when the side shoulders are disposed in an opposed arrangement wherein the side shoulders are aligned along a plane that intersects the hydrodynamic groove. The converging step enhances stiffness of the thin film.

In accordance with other method embodiments, the method further includes the step of impinging one side wall by the lateral flow formed by the side shoulder along another side wall. The impinging step enhances stiffness of the thin film.

Several advantages are offered by the invention. The invention minimizes distortional effects along a piston ring caused by hydrodynamic loads which otherwise prevent the ring from contacting a mating ring as the piston ring translates between a pair of mating rings. The invention minimizes wear along a piston ring within turbine engines including co-rotating or counter-rotating shafts, thereby reducing engine maintenance.

BRIEF DESCRIPTION OF THE INVENTION

The invention will now be described in more detail, by way of example only, with reference to the accompanying drawings.

FIG. 1 is a cross-sectional view illustrating an intershaft seal assembly disposed between concentric, rotatable inner and outer shafts wherein the seal assembly includes a piston ring rotatably disposed with the outer shaft and a pair of mating rings rotatably disposed with the inner shaft wherein each mating ring further includes a plurality of multi-axis stepped grooves in accordance with an embodiment of the invention.

Figure 6A:
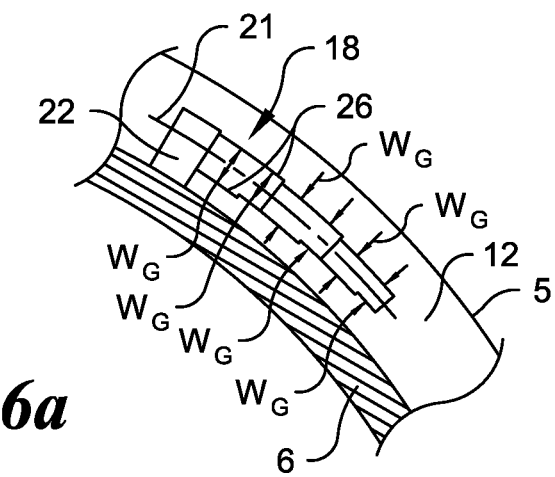

FIG. 6a is a side view illustrating a multi-axis stepped groove disposed along a sealing face of an aft mating ring wherein a feed groove communicates with a hydrodynamic groove and the hydrodynamic groove further includes side shoulders and base shoulders wherein one side shoulder intersects a base shoulder and other side shoulders are arranged in an offset arrangement about the intersecting side and base shoulders in accordance with an embodiment of the invention.

Figure 6B:
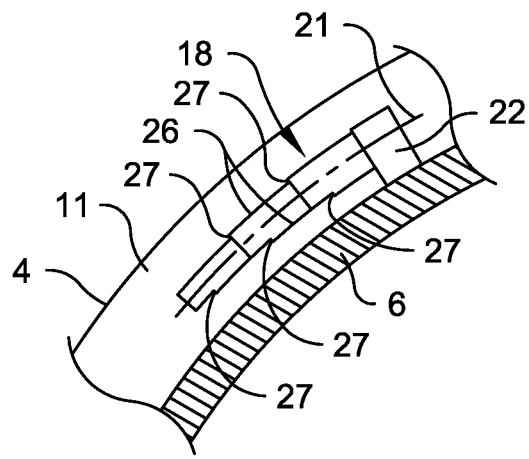

FIG. 6b is a side view illustrating a multi-axis stepped groove disposed along a sealing face of a forward mating ring wherein a feed groove communicates with a hydrodynamic groove and the hydrodynamic groove further includes side shoulders and base shoulders wherein one side shoulder intersects a base shoulder and other side shoulders are arranged in an offset arrangement about the intersecting side and base shoulders in accordance with an embodiment of the invention.

Figure 7A:
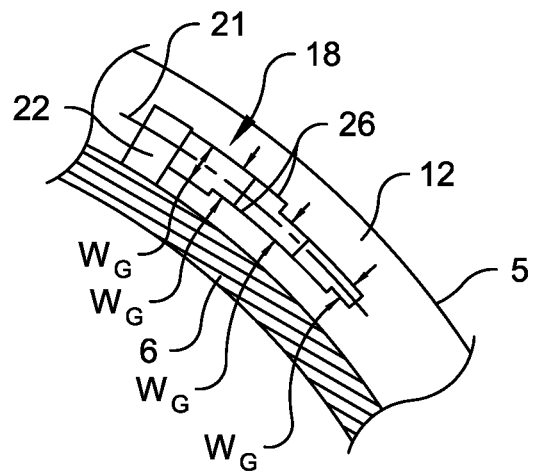

FIG. 7a is a side view illustrating a multi-axis stepped groove disposed along a sealing face of an aft mating ring wherein a feed groove communicates with a hydrodynamic groove and the hydrodynamic groove further includes side shoulders and base shoulders so that a pair of side shoulders are disposed about a base shoulder and the side shoulders are arranged in an offset arrangement in accordance with an embodiment of the invention.

Figure 7B:
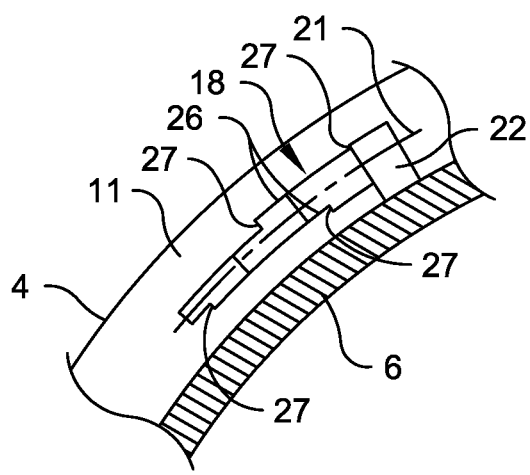

FIG. 7b is a side view illustrating a multi-axis stepped groove disposed along a sealing face of a forward mating ring wherein a feed groove communicates with a hydrodynamic groove and the hydrodynamic groove further includes side shoulders and base shoulders so that a pair of side shoulders are disposed about a base shoulder and the side shoulders are arranged in an offset arrangement in accordance with an embodiment of the invention.

Figure 7C:
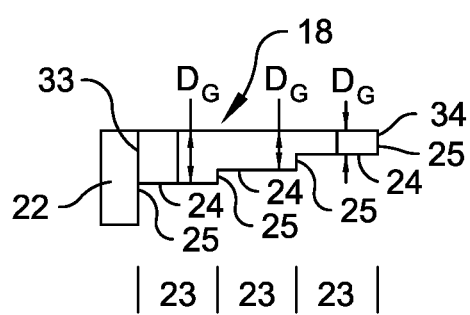

FIG. 7c is a first cross-sectional view along a radial centerline illustrating a multi-axis stepped groove wherein a feed groove communicates with a hydrodynamic groove and the hydrodynamic groove further includes side shoulders and base shoulders so that a pair of side shoulders are disposed about a base shoulder and the side shoulders are arranged in an offset arrangement in accordance with an embodiment of the invention.

Figure 7D:
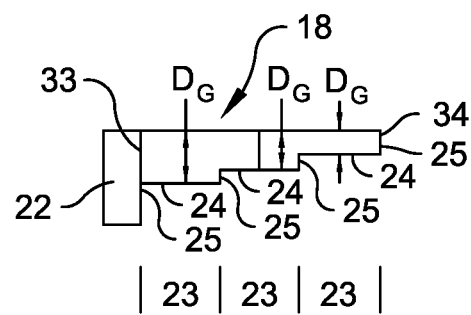

FIG. 7d is a second cross-sectional view along a radial centerline illustrating a multi-axis stepped groove wherein a feed groove communicates with a hydrodynamic groove and the hydrodynamic groove further includes side shoulders and base shoulders so that a pair of side shoulders are disposed about a base shoulder and the side shoulders are arranged in an offset arrangement in accordance with an embodiment of the invention.

Figure 8A:
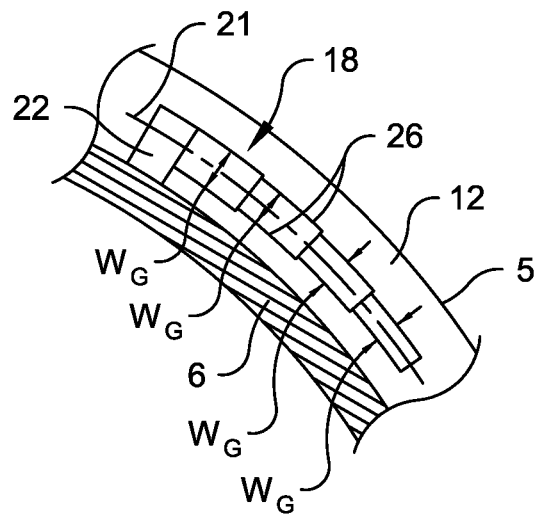

FIG. 8a is a side view illustrating a multi-axis stepped groove disposed along a sealing face of an aft mating ring wherein a feed groove communicates with a hydrodynamic groove and the hydrodynamic groove further includes side shoulders disposed along parallel side walls and base shoulders disposed between tapered base walls which intersect and the side shoulders arranged in an opposed arrangement in accordance with an embodiment of the invention.

Figure 8B:
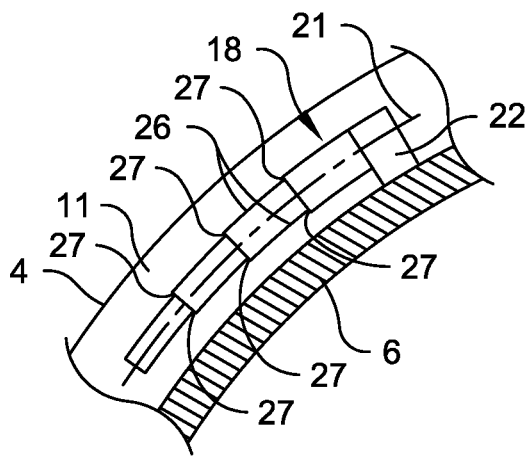

FIG. 8b is a side view illustrating a multi-axis stepped groove disposed along a sealing face of a forward mating ring wherein a feed groove communicates with a hydrodynamic groove and the hydrodynamic groove further includes side shoulders disposed along parallel side walls and base shoulders disposed between tapered base walls which intersect and the side shoulders arranged in an opposed arrangement in accordance with an embodiment of the invention.

Figure 8C:
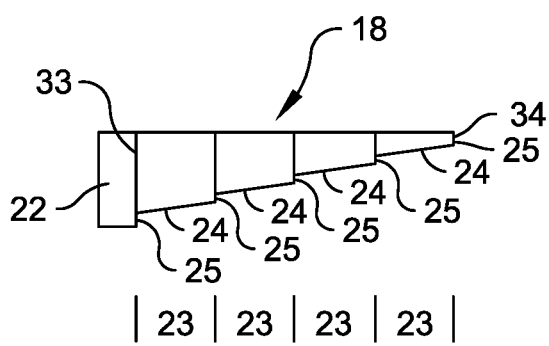

FIG. 8c is a cross-sectional view along a radial centerline illustrating a multi-axis stepped groove wherein a feed groove communicates with a groove and the hydrodynamic groove further includes side shoulders disposed along parallel side walls and base shoulders disposed between tapered base walls which intersect and the side shoulders arranged in an opposed arrangement in accordance with an embodiment of the invention.

Figure 9A:
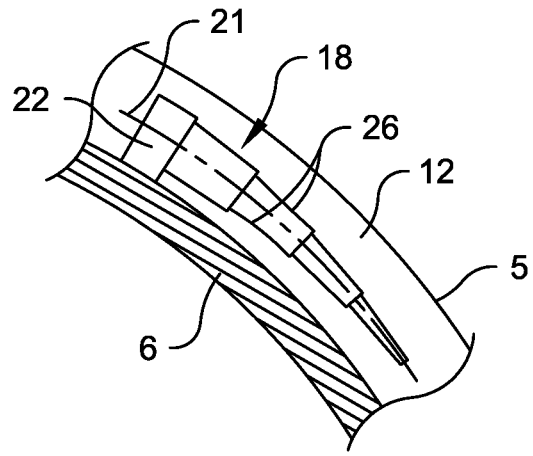

FIG. 9a is a side view illustrating a multi-axis stepped groove disposed along a sealing face of an aft mating ring wherein a feed groove communicates with a hydrodynamic groove and the hydrodynamic groove further includes side shoulders disposed along tapered side walls and base shoulders disposed between parallel base walls in accordance with an embodiment of the invention.

Figure 9B:
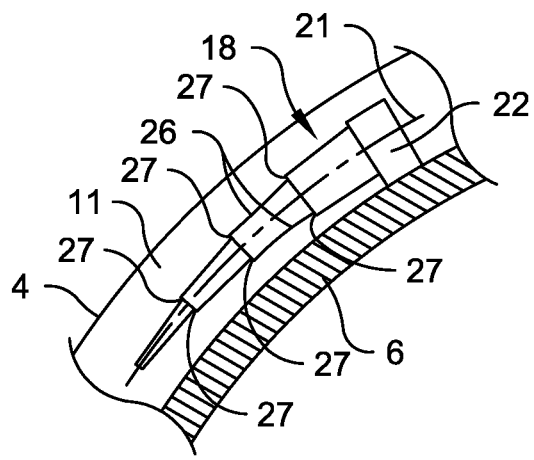

FIG. 9b is a side view illustrating a multi-axis stepped groove disposed along a sealing face of a forward mating ring wherein a feed groove communicates with a hydrodynamic groove and the hydrodynamic groove further includes side shoulders disposed along tapered side walls and base shoulders disposed between parallel base walls in accordance with an embodiment of the invention.

Figure 9C:
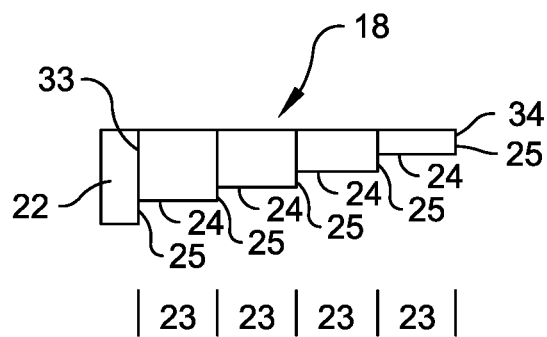

FIG. 9c is a cross-sectional view along a radial centerline illustrating a multi-axis stepped groove wherein a feed groove communicates with a hydrodynamic and the hydrodynamic groove further includes side shoulders disposed along tapered side walls and base shoulders disposed between parallel base walls in accordance with an embodiment of the invention.

Figure 10A:
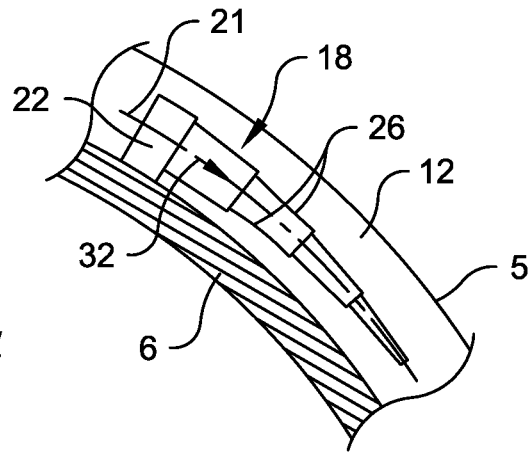

FIG. 10a is a side view illustrating a multi-axis stepped groove disposed along a sealing face of an aft mating ring wherein a feed groove communicates with a hydrodynamic groove and the hydrodynamic groove further includes side shoulders disposed along tapered side walls and base shoulders disposed between tapered base walls in accordance with an embodiment of the invention.

Figure 10B:
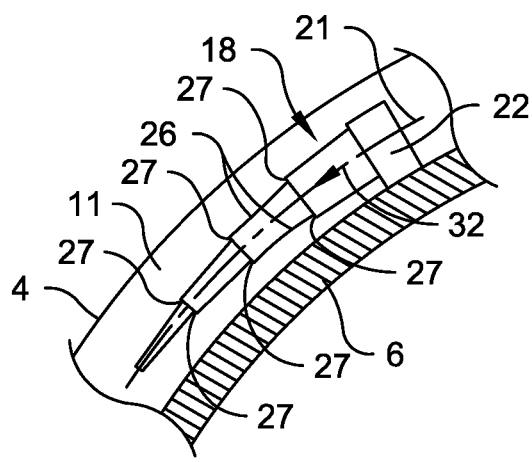

FIG. 10b is a side view illustrating a multi-axis stepped groove disposed along a sealing face of a forward mating ring wherein a feed groove communicates with a hydrodynamic groove and the hydrodynamic groove further includes side shoulders disposed along tapered side walls and base shoulders disposed between tapered base walls in accordance with an embodiment of the invention.

Figure 10C:
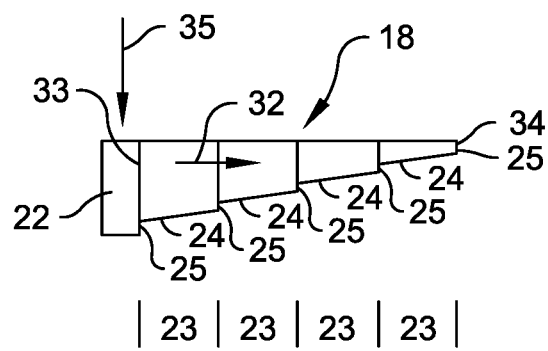

FIG. 10c is a cross-sectional view along a radial centerline illustrating a multi-axis stepped groove wherein a feed groove communicates with a hydrodynamic groove and the hydrodynamic groove further includes side shoulders disposed along tapered side walls and base shoulders disposed between tapered base walls in accordance with an embodiment of the invention.

Figure 11A:
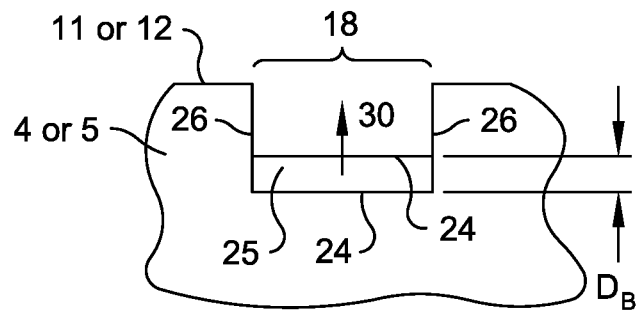

FIG. 11a is a cross-sectional view in the downstream direction illustrating a mating ring with a base shoulder within a hydrodynamic groove when the base shoulder does not intersect a side shoulder in accordance with an embodiment of the invention.

Figure 11B:
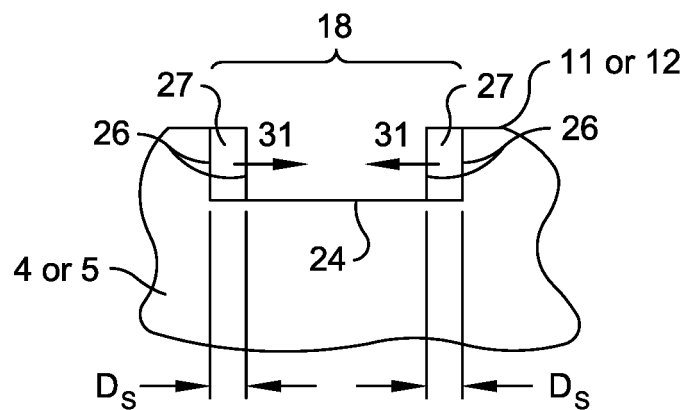

FIG. 11b is a cross-sectional view in the downstream direction illustrating a mating ring with a pair of side shoulders arranged in an opposed arrangement within a hydrodynamic groove when the side shoulders do not intersect a base shoulder in accordance with an embodiment of the invention.

Figure 11C:
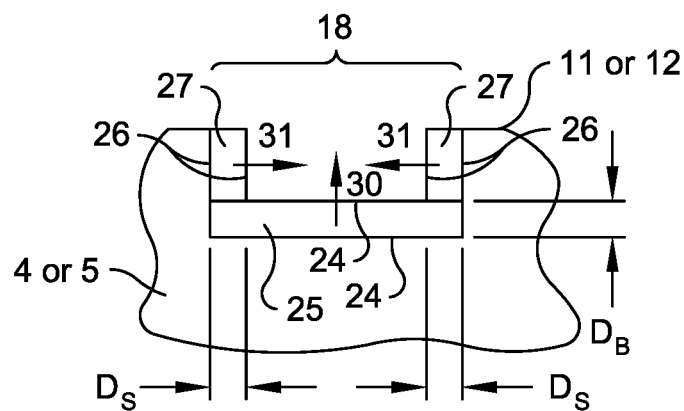

FIG. 11c is a cross-sectional view in the downstream direction illustrating a mating ring with intersecting base shoulder and side shoulders within a hydrodynamic groove in accordance with an embodiment of the invention.

Figure 11D:
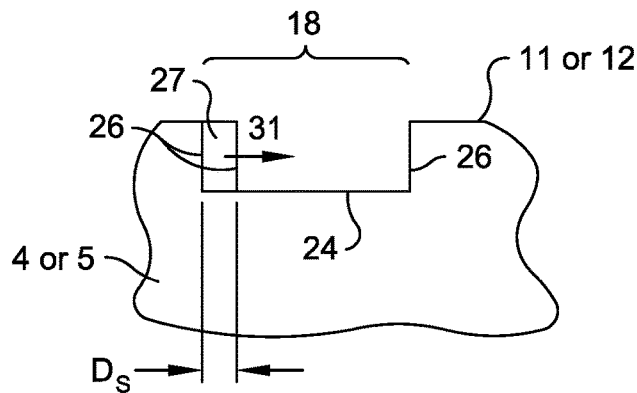

FIG. 11d is a cross-sectional view in the downstream direction illustrating a mating ring with a side shoulder arranged at a left side within a hydrodynamic groove when the side shoulder is not arranged in an opposed arrangement with another side shoulder and the side shoulder does not intersect a base shoulder in accordance with an embodiment of the invention.

Figure 11E:
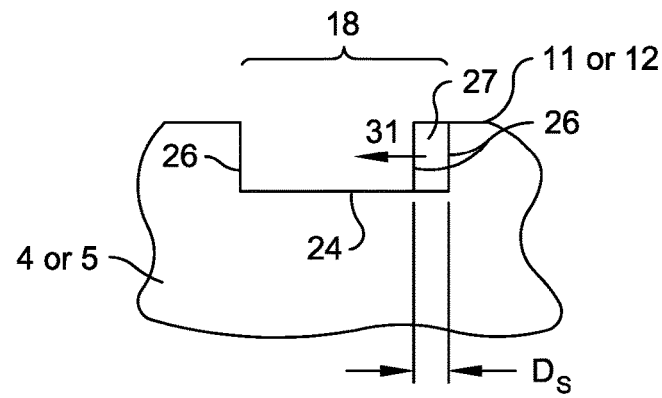

FIG. 11e is a cross-sectional view in the downstream direction illustrating a mating ring with a side shoulder arranged at a right side within a hydrodynamic groove when the side shoulder is not arranged in an opposed arrangement with another side shoulder and the side shoulder does not intersect a base shoulder in accordance with an embodiment of the invention.

Figure 11F:
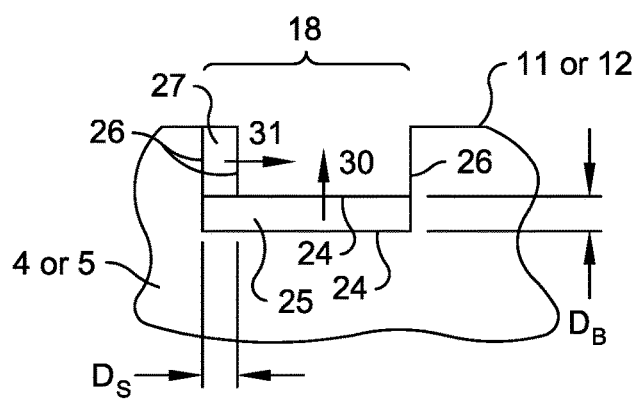

FIG. 11f is a cross-sectional view in the downstream direction illustrating a mating ring with a side shoulder arranged at a left side within a hydrodynamic groove when the side shoulder is not arranged in an opposed arrangement with another side shoulder and the side shoulder intersects a base shoulder in accordance with an embodiment of the invention.

Figure 11G:
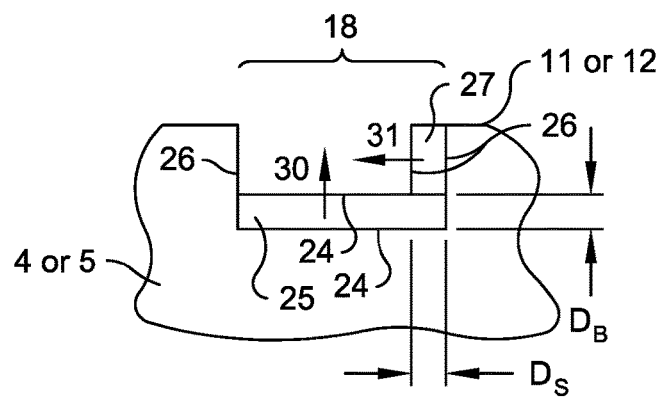

FIG. 11g is a cross-sectional view in the downstream direction illustrating a mating ring with a side shoulder arranged at a right side within a hydrodynamic groove when the side shoulder is not arranged in an opposed arrangement with another side shoulder and the side shoulder intersects a base shoulder in accordance with an embodiment of the invention.

DETAILED DESCRIPTION OF THE INVENTION

Reference will now be made in detail to several preferred embodiments of the invention that are illustrated in the accompanying drawings. Wherever possible, same or similar reference numerals are used in the drawings and the description to refer to the same or like parts or steps. The drawings are in simplified form and are not to precise scale.

While features of various embodiments are separately described throughout this document, it is understood that two or more such features could be combined into a single embodiment.

Figure 1:
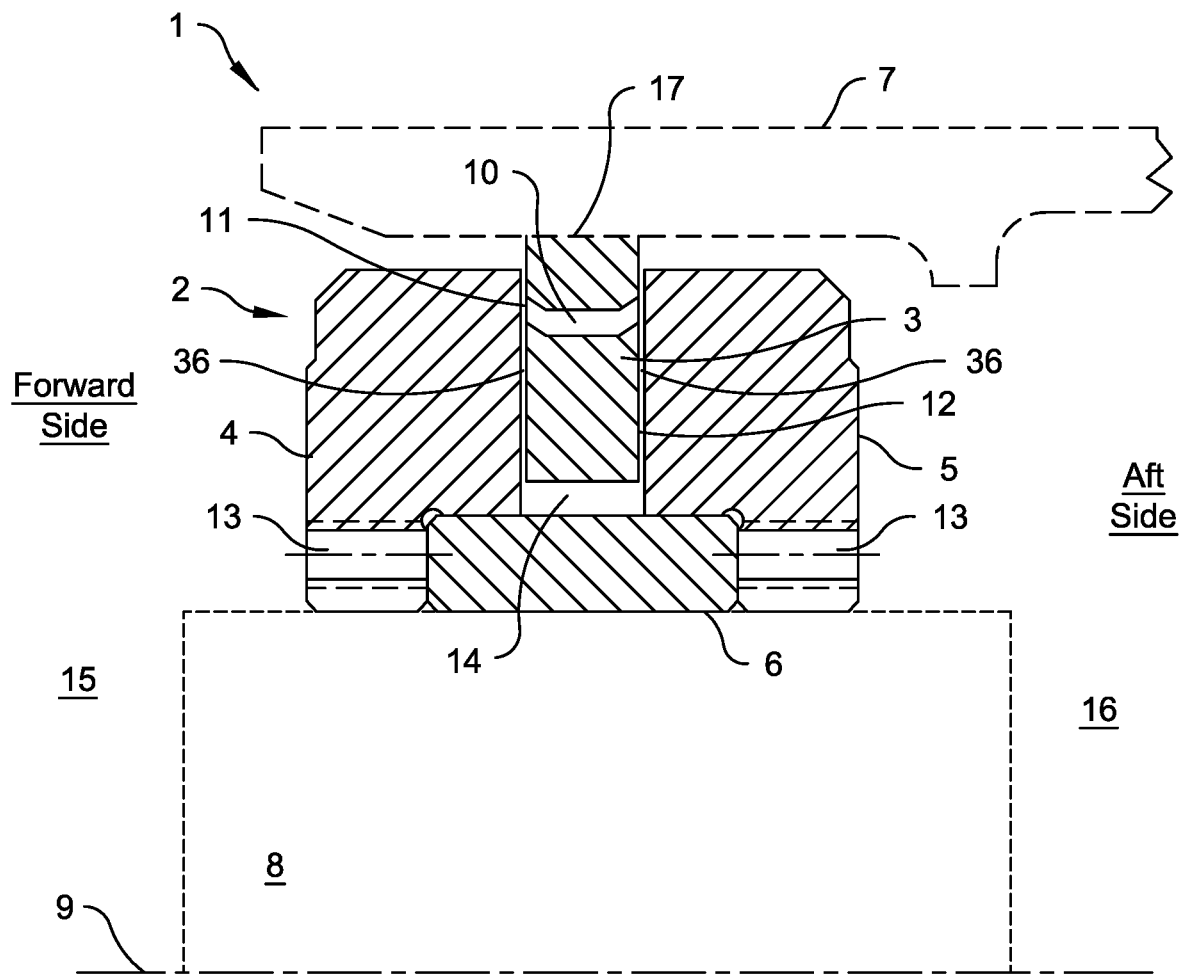
Figure 2:
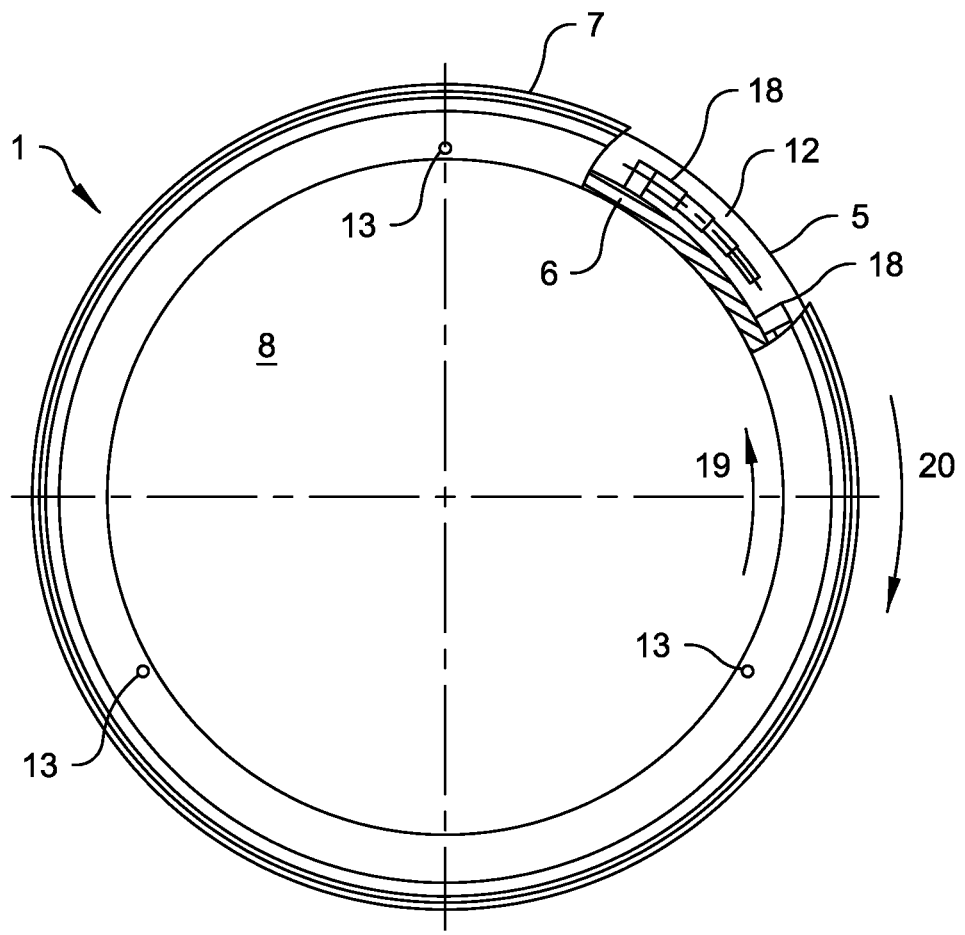
FIG. 2 is a partial section view illustrating an exemplary multi-axis stepped groove disposed along a sealing face of a mating ring in accordance with an embodiment of the invention.

Referring now to FIGS. 1 and 2, a seal system 1 is shown wherein an intershaft seal assembly 2 is interposed between an outer shaft 7 and an inner shaft 8. The intershaft seal assembly 2 separates fluid(s) within a forward or higher pressure side 15 from fluid(s) within an aft or lower pressure side 16 while also permitting for separate rotation by the outer shaft 7 and the inner shaft 8. The outer and inner shafts 7, 8 may co-rotate or counter-rotate about a rotational axis 9, typically oriented along the longitudinal axis of a turbine engine.

Referring again to FIGS. 1 and 2, the intershaft seal assembly 2 is further shown with a piston ring 3, a forward mating ring 4, an aft mating ring 5, and an optional spacer ring 6. The forward and aft mating rings 4, 5 and spacer ring 6 are disposed about the inner shaft 8, preferable slidingly engaging the outer diameter of the inner shaft 8. The piston ring 3 is interposed between the forward and aft mating rings 4, 5 and disposed about the spacer ring 6. The forward and aft mating rings 4, 5 are separately positioned along the inner shaft 8 so that the respective sealing faces 11, 12 do not contact the piston ring 3. In preferred embodiments, the spacer ring 6 is configured to contact and separate the forward and aft mating rings 4, 5 so as to maintain the distance required to avoid wear along both faces of the piston ring 3. In embodiments without a spacer ring 6, features along the inner shaft 8 may facilitate proper placement of the forward and aft mating rings 4, 5 with respect to the piston ring 3.

Referring again to FIG. 1, separation between the piston ring 3 and each sealing face 11, 12 is minimized to facilitate formation of a thin film 36 along each face of the piston ring 3. The thin film 36 is located between the piston ring 3 and each sealing face 11, 12 thereby forming a pair of seals which resist migration of one or more fluids across the intershaft seal assembly 2 between the higher and lower pressure sides 15, 16. Mixing of fluids originating from higher and lower pressure sides 15, 16 is problematic. For example, mixing between oil originating at the lower pressure side 16 and hot gas originating at the higher pressure side 15 could breakdown the oil to form a wear-accelerating carbon layer along sealing interfaces. In another example, mixing could allow the hot gases to cook the oil resulting in an engine fire.

Referring again to FIGS. 1 and 2, the forward and aft mating rings 4, 5 may each include one or more through holes 13, three generally illustrate in FIG. 2, positioned to align with the spacer ring 6. A fastener (not shown) may threadingly engage the through hole 13 and push against the spacer ring 6 as the fastener turns. The resultant force causes the corresponding mating ring 4, 5 to separate from other components of the seal assembly enabling access to the piston ring 3. This feature is particularly useful when the mating rings 4, 5 are secured to the spacer ring 6 via an interference fit. In other embodiments, the through holes 13 may partially traverse the mating rings 4, 5. A fastener is coupled to the partial through hole 13 and the fasteners used to pull the mating ring 4, 5 from the spacer ring 6. The forward and aft mating rings 4, 5 and the spacer ring 6 may be secured to the inner shaft 8 via means understood in the art. In some embodiments, the forward and aft mating rings 4, 5 may include a notch or the like adjacent to the inner diameter of each component, as presented in FIG. 1, so as to slidingly engage the spacer ring 6 and thereby overlay a portion thereof.

Referring again to FIGS. 1 and 2, the piston ring 3 is positioned between the sealing faces 11, 12 of the respective forward and aft mating rings 4, 5. Dimensional parameters should ensure proper placement of the piston ring 3 between the spacer ring 6 and the outer shaft 7. In preferred embodiments, the outer diameter of the piston ring 3 is the same as the inner diameter of the outer shaft 7 and the inner diameter of the piston ring 3 is sized to permit assembly onto the intershaft seal assembly 2. The piston ring 3 may further include one or more slots (not shown) which permit the piston ring 3 to expand when outer and inner shafts 7, 8 are rotated. The slots radially traverse the piston ring 3 to form a gapped ring. An annular gap 14 between the inner diameter of the piston ring 3 and the outer diameter of the spacer ring 6 may permit the piston ring 3 to contract when the inner and outer shafts 8, 7 are slowly rotated or at rest. The annular gap 14 may also allow for radial excursions by the piston ring 3 caused by misalign between inner and outer shafts 8, 7 due to mechanical events, thermal conditions, or other such factors associated with a turbine engine or its use within an aircraft.

Referring again to FIGS. 1 and 2, the outer diameter of the piston ring 3 is preferred to contact an annular sealing interface 17 along the inner diameter of the outer shaft 7 when the inner and outer shafts 8, 7 are sufficiently rotated so that the piston ring 3 may rotate with the outer shaft 7. Contact between the piston ring 3 and the outer shaft 7 along the annular sealing interface 17 also seals the interface therebetween. The contact sealing between the piston ring 3 and outer shaft 7 and the thin film 36 sealing between the piston ring 3 and each sealing face 11, 12 cooperate to mitigate fluid transport between the higher and lower pressure sides 15, 16.

Referring again to FIGS. 1 and 2, it is also further preferred that the inner diameter of each of the forward and aft mating rings 4, 5 and the spacer ring 6 contact the outer diameter of the inner shaft 8 so as to rotate with the inner shaft 8. The inner shaft 8 may include a shoulder at the aft side and the seal assembly axially secured onto the shoulder via a lock nut (not shown). Contact between the aft mating ring 5 and the shoulder could seal the interface therebetween, thereby sealingly mitigating fluid transport between the higher and lower pressure sides 15, 16. The spacing between the piston ring 3 and the respective sealing faces 11, 12 is maintained by the thin films 36 therebetween so as to avoid rubbing contact with and frictional wear to the piston ring 3 which may result from the difference in rotational velocities and/or rotational directions 19, 20 between the piston ring 3 which rotates with the outer shaft 7 and the forward and aft mating rings 4, 5 which rotate with the inner shaft 8.

Referring again to FIG. 1, the piston ring 3 may include one or more optional channels 10 which traverse the width of the piston ring 3. Each channel 10 may permit fluid within or adjacent to one thin film 36 at the sealing face 11 and/or fluid within or adjacent to another thin film 36 at the sealing face 12 to traverse the piston ring 3 as required by conditions within or adjacent to the intershaft seal assembly 2. In preferred embodiments, the channels 10 intersect a circumferential groove (not shown) at each sealing face 11, 12. The respective channels 10 and groove arrangement facilitate fluid flow enabling a pressure balance about the piston ring 3.

Referring again to FIG. 2, two or more hydrodynamic grooves 18 are positioned along each of the sealing faces 11, 12 to facilitate formation of a thin film 36 therebetween which resists contact between the piston ring 3 and the respective forward and aft mating rings 4, 5. The hydrodynamic grooves 18 along the forward mating ring 4 (not shown) are oriented in the same direction as those along the aft mating ring 5 so as to facilitate proper formation of the respective thin films 36 about the piston ring 3.

Figure 3A:
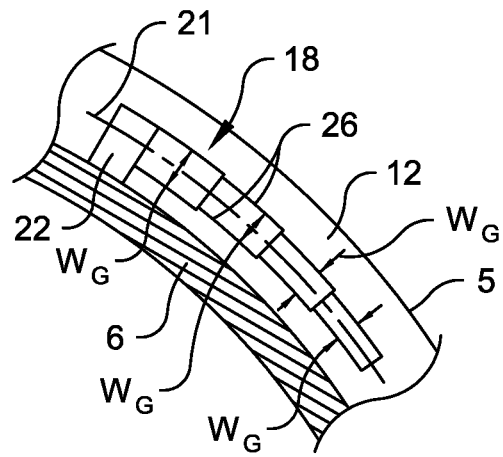
FIG. 3a is a side view illustrating a multi-axis stepped groove disposed along a sealing face of an aft mating ring wherein a feed groove communicates with a hydrodynamic groove and the hydrodynamic groove further includes side shoulders and base shoulders which intersect so that the side shoulders are arranged in an opposed arrangement in accordance with an embodiment of the invention.
Figure 3B:
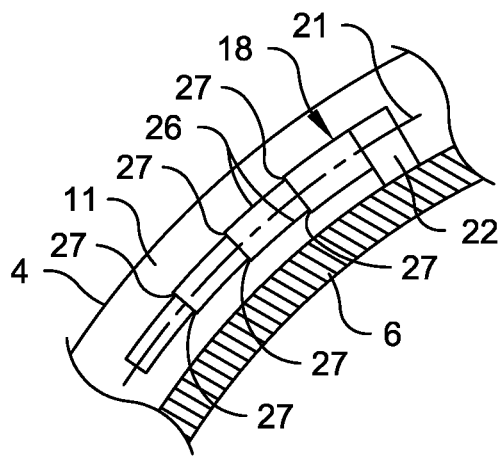
FIG. 3b is a side view illustrating a multi-axis stepped groove disposed along a sealing face of a forward mating ring wherein a feed groove communicates with a hydrodynamic groove and the hydrodynamic groove further includes side shoulders and base shoulders which intersect so that the side shoulders are arranged in an opposed arrangement in accordance with an embodiment of the invention.
Figure 3C:
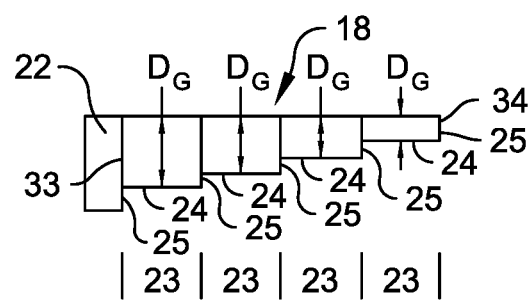
FIG. 3c is a cross-sectional view along a radial centerline illustrating a multi-axis stepped groove wherein a feed groove communicates with a hydrodynamic groove and the hydrodynamic groove further includes side shoulders and base shoulders which intersect so that the side shoulders are arranged in an opposed arrangement in accordance with an embodiment of the invention.
Figure 4A:
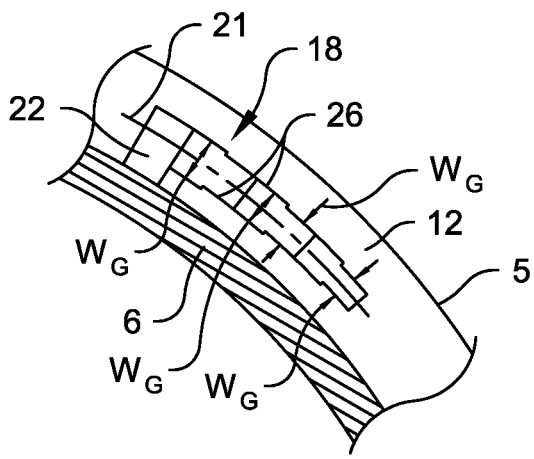
FIG. 4a is a side view illustrating a multi-axis stepped groove disposed along a sealing face of an aft mating ring wherein a feed groove communicates with a hydrodynamic groove and the hydrodynamic groove further includes side shoulders and base shoulders which are offset so that the side shoulders are arranged in an opposed arrangement in accordance with an embodiment of the invention.
Figure 4B:
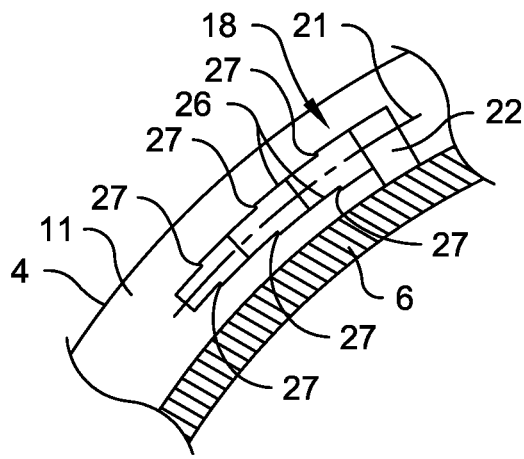
FIG. 4b is a side view illustrating a multi-axis stepped groove disposed along a sealing face of a forward mating ring wherein a feed groove communicates with a hydrodynamic groove and the hydrodynamic groove further includes side shoulders and base shoulders which are offset so that the side shoulders are arranged in an opposed arrangement in accordance with an embodiment of the invention.
Figure 4C:
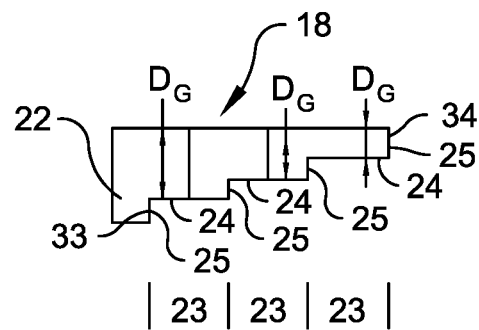
FIG. 4c is a cross-sectional view along a radial centerline illustrating a multi-axis stepped groove wherein a feed groove communicates with a groove and the hydrodynamic groove further includes side shoulders and base shoulders which are offset so that the side shoulders are arranged in an opposed arrangement in accordance with an embodiment of the invention.
Figure 5A:
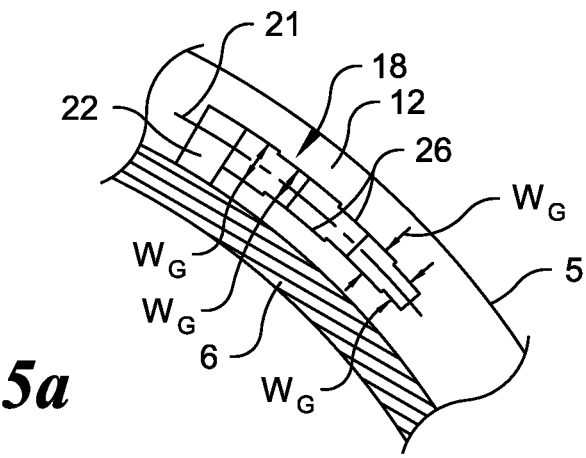
FIG. 5a is a side view illustrating a multi-axis stepped groove disposed along a sealing face of an aft mating ring wherein a feed groove communicates with a hydrodynamic groove and the hydrodynamic groove further includes side shoulders and base shoulders which are offset so that the side shoulders are arranged in an offset arrangement in accordance with an embodiment of the invention.
Figure 5B:
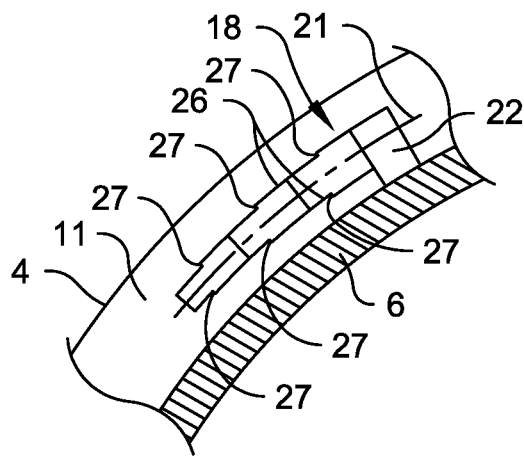
FIG. 5b is a side view illustrating a multi-axis stepped groove disposed along a sealing face of a forward mating ring wherein a feed groove communicates with a hydrodynamic groove and the hydrodynamic groove further includes side shoulders and base shoulders which are offset so that the side shoulders are arranged in an offset arrangement in accordance with an embodiment of the invention.
Figure 5C:
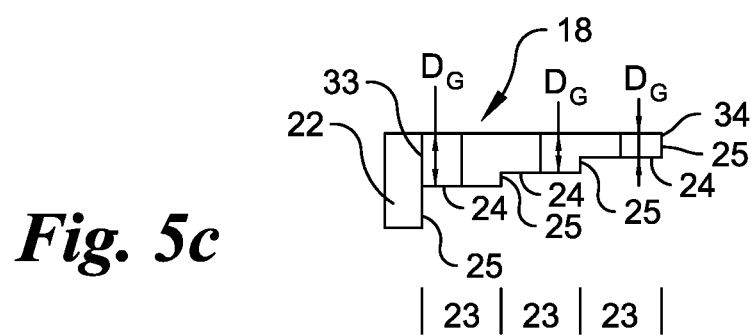
FIG. 5c is a cross-sectional view along a radial centerline illustrating a multi-axis stepped groove wherein a feed groove communicates with a hydrodynamic groove and the hydrodynamic groove further includes side shoulders and base shoulders which are offset so that the side shoulders are arranged in an offset arrangement in accordance with an embodiment of the invention.

Referring now to FIGS. 3a-3c, each hydrodynamic groove 18 is positioned along the sealing face 12 of the aft mating ring 5 (see FIG. 3a) and the sealing face 11 of the forward mating ring 4 (see FIG. 3b). The hydrodynamic groove 18 intersects a feed groove 22. The feed groove 22 is biased toward the spacer ring 6 so as to communicate at one end with the gap 14 adjacent to the inner diameter of the piston ring 3 (see FIG. 1) and at another end with the hydrodynamic groove 18. Although one hydrodynamic groove 18 is illustrated for descriptive purposes in each of FIGS. 3a and 3b, it is understood that a plurality of hydrodynamic grooves 18 with feed grooves 22 are situated about the sealing faces 11, 12 so as to properly maintain a thin layer 36 between the piston ring 3 and each of the forward and aft mating rings 4, 5.

Referring again to FIGS. 3a-3c, the feed groove 22 is communicable with the hydrodynamic groove 18 so that a gas entering the feed groove 22, for example via the gap 14, thereafter flows into hydrodynamic groove 18. The hydrodynamic groove 18 is positioned with respect to the feed groove 22 so that the gas flows into and then along the hydrodynamic groove 18 from an upstream end 33 to a downstream end 34. The resultant flow pattern is in a direction opposite to the rotational direction of the forward and aft mating rings 4, 5.

Referring again to FIGS. 3a-3c, the hydrodynamic groove 18 includes two or more steps 23, although four steps 23 are illustrated by way of example. Each step 23 includes and is defined by a base wall 24 which corresponds to the bottom of the hydrodynamic groove 18. Base walls 24 are situated relative to one another so that the effective groove depth $D_G$ decreases along the hydrodynamic groove 18 from the upstream end 33 to the downstream end 34. Each two adjoining steps 23 are separated by a base shoulder 25. The base shoulder 25 is an abrupt change or discontinuity between two base walls 24 which defines an abrupt change or discontinuity in the depth profile along the hydrodynamic groove 18. The base shoulder 25 is disposed between a pair of base walls 24 so that the deeper end of the base shoulder 25 contacts the downstream side of one base wall 24 and the less-deep end of the base shoulder 25 contacts the upstream side of another base wall 24. An additional base shoulder 25 may be positioned at the downstream end 34 to terminate the hydrodynamic groove 18. The resulting profile formed by the base walls 24 and the base shoulder(s) 25 defines the floor or base portion of a hydrodynamic groove 18. In some embodiments, a base shoulder 25 may be located at the interface between the feed groove 22 and a hydrodynamic groove 18, as illustrated in FIGS. 3a-3c. In other embodiments, the depths of the feed groove 22 and the first step 23 at the inlet end may be the same.

Referring again to FIGS. 3a-3c, the hydrodynamic groove 18 further includes a pair of side walls 26. The side walls 26 are disposed about and intersect two or more base walls 24 to define the shape of a hydrodynamic groove 18. Each side wall 26 may include one or more side shoulders 27. In other embodiments, the side shoulders 27 could reside along only one side wall 26. A side shoulder 27 is an abrupt change or discontinuity along a side wall 26 which defines an abrupt change or discontinuity in the width profile of the hydrodynamic groove 18. The side shoulder 27 is disposed along a side wall 26 so that the groove width $W_G$ upstream from the side shoulder 27 is wider than the groove width $W_G$ downstream from the side shoulder 27. The resulting profile formed by each side wall 26 and corresponding side shoulder(s) 27 defines the lateral bounds of a hydrodynamic groove 18 wherein the effective groove width $W_G$ decreases along the hydrodynamic groove 18 from the upstream end 33 to the downstream end 34.

The features of other embodiments illustrated in FIGS. 4a-4c, 5a-5c, 6a-6b, 7a-7d, 8a-8c, 9a-9c, and 10a-10c similar to those in FIGS. 3a-3c are illustrated with the same reference numerals, except as otherwise provided for herein.

Referring now to FIGS. 3a, 3b, and 11c, the side shoulders 27 may be situated so as to intersect the base shoulder 25. The side shoulders 27 are aligned in an opposed arrangement wherein one side shoulder 27 along one side wall 26 is directly across from another side shoulder 27 along another side wall 26. The side shoulders 27 are further aligned with the base shoulder 25 forming a substantially U-shaped wall along a plane which intersects the hydrodynamic groove 18 between two adjoining steps 23, as generally illustrated in FIGS. 3c and 11c. A narrowing of both the groove depth $D_G$ between adjoining steps 23 via a base shoulder 25 and the groove width $W_G$ between adjoining steps 23 via the side shoulders 27 reduces the local volume from one step 23 to another step 23 causing a corresponding increase in the effective local pressure of the fluid in the downstream step(s) 23. This higher effective pressure improves the stiffness and sealing properties of the thin film 36 between the piston ring 3 and the sealing face 11 and the thin film 36 (see FIG. 1) between the piston ring 3 and the sealing face 12.

Referring now to FIGS. 4a-4c, 11a and 11b, the side shoulders 27 may be situated in an offset arrangement with respect to a base shoulder 25. In these embodiments, the base shoulder 25 is disposed between a pair of side shoulders 27 along each side wall 26. Two side shoulders 27 are aligned in an opposed arrangement along a plane which bisects the hydrodynamic groove 18 upstream from the base shoulder 25 wherein one side shoulder 27 along one side wall 26 is directly across from another side shoulder 27 along another side wall 26. Two other side shoulders 27 are aligned in an opposed arrangement along a plane which bisects the hydrodynamic groove 18 downstream from the base shoulder 25 wherein one side shoulder 27 along one side wall 26 is directly across from another side shoulder 27 along another side wall 26. The separation between base shoulder 25 and paired side shoulders 27 results in a decrease in the groove depth $D_G$ at the interface between adjoining steps 23 as illustrated in FIG. 11a and a decrease in the groove width $W_G$ both upstream and downstream from the base shoulder 25 as illustrated FIG. 11b. The bifurcated narrowing causes corresponding increases in the effective local pressure of the fluid along each step 23 and between adjoining steps 23.

Referring now to FIGS. 5a-5c, 11a, 11d and 11e, the side shoulders 27 may be situated in an offset arrangement with respect to the base shoulder 25. In these embodiments, the base shoulder 25 is disposed between a pair of side shoulders 27 along each side wall 26. Two side shoulders 27 are positioned in an offset arrangement upstream from the base shoulder 25 wherein one side shoulder 27 along one side wall 26 is not directly across from another side shoulder 27 along another side wall 26. Two other side shoulders 27 are offset downstream from the base shoulder 25 wherein one side shoulder 27 along one side wall 26 is not directly across from another side shoulder 27 along another side wall 26. The separation between base shoulder 25 and side shoulders 27 causes a decrease in the groove depth $D_G$ at the interface between adjoining steps 23 as illustrated in FIG. 11a and causes a two-step decrease in the groove width $W_G$ upstream and downstream from the base shoulder 25 as generally illustrated in FIGS. 11d and 11e. The separate and bifurcated narrowing causes corresponding increases in the effective local pressure of the fluid along each step 23 and between adjoining steps 23.

Referring now to FIGS. 6a-6b, 3c, 4c, 11d, 11e, 11f, and 11g, the side shoulders 27 may be situated in an intersecting arrangement and an offset arrangement with respect to the base shoulder 25. In these embodiments, one side shoulder 27 intersects the base shoulder 25 along one side wall 26 and the base shoulder 25 is disposed between a pair of side shoulders 27 along another side wall 26. For the paired side shoulders 27, one side shoulder 27 is upstream and another side shoulder 27 is downstream from the intersecting base shoulder 25 and side shoulder 27. The intersecting base shoulder 25 and side shoulder 27 causes a decrease in the groove depth $D_G$ and the groove width $W_G$ at the interface between adjoining steps 23 as illustrated in FIG. 11f or 11g. Other side shoulders 27 cause a decrease in the groove width $W_G$ upstream and downstream from the base shoulder 25 as generally illustrated in FIG. 11d or 11e. The separate and bifurcated narrowing causes corresponding increases in the effective local pressure of the fluid along each step 23 and between adjoining steps 23.

Referring now to FIGS. 7a-7d, 11a, 11d and 11e, the side shoulders 27 may be situated in an offset arrangement with respect to the base shoulder 25. In these embodiments, the base shoulder 25 is disposed between a pair of side shoulders 27. One side shoulder 27 is upstream along one side wall 26 and another side shoulder 27 is downstream along another side wall 26. The separation between the base shoulder 25 and side shoulders 27 causes a decrease in the groove depth $D_G$ at the interface between adjoining steps 23 as illustrated in FIG. 11a. The offset arrangement between each side shoulder 27 and the base shoulder 25 causes a decrease in the groove width $W_G$ upstream and downstream from the base shoulder 25 as generally illustrated in FIG. 11d or 11e. The separate and bifurcated narrowing causes corresponding increases in the effective local pressure of the fluid along each step 23 and between adjoining steps 23.

Referring now to FIGS. 1, 3a, 3b, 4a, 4b, 5a, 5b, 6a, 6b, 7a, 7b, 8a, 8b, 9a, 9b, 10a, and 10b, the side walls 26 may be disposed about a radial centerline 21 along the sealing face 11 of the forward mating ring 4 and/or the sealing face 12 of the aft mating ring 5. The radial centerline 21 may be substantially circular so as to position the hydrodynamic grooves 18 at a uniform radial distance from the rotational axis 9. In preferred embodiments, the base shoulders 25 may be aligned with the rotational axis 9 and bisected by the radial centerline 21 so that the outer side wall 26 is longer than the inner side wall 26 along each step 23. Other orientations and arrangements are possible for the hydrodynamic grooves 18 with respect to the radial centerline 21 and rotational axis 9.

Referring now to FIGS. 3a-3c, 4a-4c, 5a-5c, 6a-6c, and 7a-7c, at least a portion of the side walls 26 and the base wall 24 defining a step 23 may be oriented in a parallel configuration regardless of the number, location(s) and dimensional properties of side shoulders 27 and base shoulders 25. The resultant profiles facilitate an abrupt reduction to the cross-sectional area of the hydrodynamic groove 18 after each side shoulder 27 and/or each base shoulder 25. Each abrupt decrease in cross-sectional area corresponds to an abrupt increase in both velocity and pressure of the fluid. In other embodiments, it may be advantageous to include additional features to the various hydrodynamic grooves 18 described herein which permit for a more continuous reduction in the cross-sectional area.

Referring now to FIGS. 8a-8c, the base walls 24 may be tapered so that the cross-sectional area along a step 23 gradually decreases from upstream to downstream. In these embodiments, the step 23 is tapered so that the depth at the upstream side is greater than the depth at the downstream side. One or more base shoulders 25 disposed between two or more base walls 24 and/or one or more side shoulders 27 along one or both side walls 26 may facilitate abrupt changes in the cross-sectional area along a hydrodynamic groove 18 as required by the end use. The side walls 26 may be disposed in a parallel arrangement regardless of the location of the side shoulders 27 so that changes to the cross-sectional area along a hydrodynamic groove 18 are determined by the taper profile of the base wall 24, the number, location and dimensions of the base shoulder(s) 25, and the number, location and dimensions of the side shoulder(s) 27.

Referring now to FIGS. 9a-9c, the side walls 26 may be tapered so that the cross-sectional area along at least a portion of one or more steps 23 may gradually decrease from upstream to downstream. A side wall 26 is tapered in part or whole so that the upstream width of a hydrodynamic groove 18 is greater than the downstream width of the same groove 18. One or more base shoulders 25 disposed between two or more base walls 24 and/or one or more side shoulders 27 along one or both side walls 26 may facilitate abrupt changes in the cross-sectional area along a hydrodynamic groove 18 as required by the end use. The base walls 24 may be disposed in a parallel arrangement regardless of the location of the base shoulders 25 so that changes to the cross-sectional area along a hydrodynamic groove 18 are determined by the taper profile of each side wall 26, the number, location and dimensions of the base shoulder(s) 25, and the number, location and dimensions of the side shoulder(s) 27.

Referring now to FIGS. 10a-10c, the base walls 24 and the side walls 26 may be tapered as otherwise separately described with reference to FIGS. 8a-8c and 9a-9c so that the cross-sectional area along each step 23 gradually decreases from upstream to downstream. Base shoulder(s) 25 and/or side shoulder(s) 27 may facilitate abrupt changes in the cross-sectional area along a hydrodynamic groove 18 as required by the end use. Resultant changes to the cross-sectional area along a hydrodynamic groove 18 are determined by the taper profile of each base wall 24 and each side wall 26, the number, location and dimensional properties of the base shoulder(s) 25, and the number, location and dimensional properties of the side shoulder(s) 27.

Referring again to FIGS. 10a-10c, a source flow 35 is communicated into the feed groove 22. The source flow 35 may include one or more fluids that reside or otherwise enter between the forward and aft mating rings 4, 5. The source flow 35 exits the feed groove 22 and flows into the hydrodynamic groove 18. After entering the hydrodynamic groove 18, the fluid generally prefers a pathway from the upstream end 33 to the downstream end 34 thereby establishing a longitudinal flow 32. The longitudinal flow 32 traverses the hydrodynamic groove 18 so as to interact with features of and along the base walls 24 and side walls 26. Each interaction may redirect the flow and increase both velocity and pressure of at least a portion of the longitudinal flow 32. The flow described with reference to FIGS. 10a-10c is likewise applicable to other embodiments described herein.

Referring now to FIGS. 10c and 11a, the transition between adjoining steps 23 may include only a base shoulder 25 disposed between a pair of base walls 24. At least a portion of the longitudinal flow 32 which interacts with, that is flows into or is impeded by, the base shoulder 25 is locally redirected as an outward flow 30. The outward flow 30 is locally redirected so as to be generally perpendicular to the longitudinal flow 32 adjacent to the base shoulder 25. The resultant flow enhances the stiffness of the thin film 36 between the piston ring 3 and each of the forward and aft mating rings 4, 5 illustrated in FIG. 1. The cross-sectional area of the hydrodynamic groove 18 is reduced by the area corresponding to the base shoulder depth DB as the longitudinal flow 32 flows from a step 23 with a deeper base wall 24 to a next step 23 with a less-deep base wall 24. The smaller cross-sectional area causes a corresponding increase to the velocity and pressure of the fluid immediately after the base shoulder 25.

Referring now to FIGS. 10c and 11b, a pair of side shoulders 27 may be disposed along a pair of side walls 26. At least a portion of the longitudinal flow 32 which interacts with, that is flows into or is impeded by, each side shoulder 27 is locally redirected as a lateral flow 31. Each lateral flow 31 is oriented generally perpendicular to the longitudinal flow 32 adjacent to the side shoulders 27. The resultant flow patterns may cause the lateral flows 31 to interact, that is converge, thereby enhancing the stiffness of the thin film 36 between the piston ring 3 and each of the forward and aft mating rings 4, 5 illustrated in FIG. 1. The cross-sectional area of the hydrodynamic groove 18 is reduced by the areas corresponding to the side shoulder depth $D_S$ as the longitudinal flow 32 flows from a wider portion of a step 23 to a less-wide portion of the same step 23. The smaller cross-sectional area causes a corresponding increase to the velocity and pressure of the fluid immediately after the side shoulders 27.

Referring now to FIGS. 10c and 11c, the transition between adjoining steps 23 may include a base shoulder 25 disposed along a base wall 24 and a pair of side shoulders 27 disposed along a pair of side walls 26. At least a portion of the longitudinal flow 32, which interacts with (either flows into or is impeded by) the base shoulder 25, is locally redirected as an outward flow 30 as described above for FIG. 11a. At least a portion of the longitudinal flow 32, which interacts with (flows into or is impeded by) each side shoulder 27, is locally redirected as a lateral flow 31 as described above for FIG. 11b. The resultant flow patterns may cause the outward flow 30, the lateral flows 31, and the longitudinal flow 32 to interact, that is converge, thereby enhancing the stiffness of the thin film 36 between the piston ring 3 and each of the forward and aft mating rings 4, 5 illustrated in FIG. 1. The cross-sectional area of the hydrodynamic groove 18 is reduced by the areas corresponding to the base shoulder depth $D_B$ and both side shoulder depths $D_S$ as the longitudinal flow 32 traverses from one step 23 into another step 23. The smaller cross-sectional area causes a corresponding increase to the velocity and pressure of the fluid immediately after the base shoulder 25 and the side shoulders 27.

Referring now to FIGS. 10c, 11d, and 11e, a side shoulder 27 may be disposed along a left side wall 26 as in FIG. 11d or a right side wall 26 as in FIG. 11e. At least a portion of the longitudinal flow 32, which interacts with a side shoulder 27, is locally redirected as a lateral flow 31 in the direction of the side wall 26 without a corresponding side shoulder 27. The lateral flow 31 is locally redirected so as to be generally perpendicular to the longitudinal flow 32 adjacent to the side shoulder 27. In some embodiments, the lateral flow 31 may impinge the side wall 26 opposite of the side shoulder 27. The resultant flow pattern may enhance the stiffness of the thin film 36 between the piston ring 3 and each of the forward and aft mating rings 4, 5 illustrated in FIG. 1. The cross-sectional area of the hydrodynamic groove 18 is reduced by the areas corresponding to the side shoulder depth $D_S$ as the longitudinal flow 32 passes from a wider portion of a step 23 to a less-wide portion of the same step 23. The smaller cross-sectional area causes a corresponding increase to the velocity and pressure of the fluid immediately after the side shoulder 27.

Referring now to FIGS. 10c, 11f, and 11g, the transition between adjoining steps 23 may include a base shoulder 25 disposed along a base wall 24 and either a left side shoulder 27 disposed along a side wall 26 as in FIG. 11f or a right side shoulder 27 disposed along a side wall 26 as in FIG. 11g. At least a portion of the longitudinal flow 32, which interacts with the base shoulder 25, is locally redirected as an outward flow 30 as described for FIG. 11a. At least a portion of the longitudinal flow 32, which interacts with a side shoulder 27, is locally redirected as a lateral flow 31 as described in FIG. 11d or FIG. 11e. The resultant flow patterns may cause the outward flow 30, the lateral flow 31, and the longitudinal flow 32 to interact, that is converge, with or without further interaction with or impingement of the side wall 26 without a side shoulder 27, thereby enhancing the stiffness of the thin film 36 illustrated in FIG. 1. The cross-sectional area of the hydrodynamic groove 18 is reduced by the areas corresponding to the base shoulder depth $D_B$ and one side shoulder depth $D_S$ as the longitudinal flow 32 traverses from one step 23 into another step 23. The smaller cross-sectional area causes a corresponding increase to the velocity and pressure of the fluid immediately after the base shoulder 25 and the side shoulder 27.

Functional aspects of the designs provided herein facilitate formation of the thin film 36 between the piston ring 3 and a sealing face 11 along the forward mating ring 4 and also the thin film 36 between the piston ring 3 and a sealing face 12 along the aft mating ring 5. A source flow 35 is first communicated into a feed groove 22 communicable with a hydrodynamic groove 18. The source flow 35 enters the hydrodynamic groove 18 and thereafter establishes a longitudinal flow 32 whereby fluid flows from one step 23 into another step 23. A first portion of the longitudinal flow 32 is redirected via interaction with a base shoulder 25 interposed between a pair of base walls 24 to form an outward flow 30 adjacent to the base shoulder 25. A second portion of the longitudinal flow 32 is redirected via interaction with a side shoulder 27 along at least one side wall 26 to form a lateral flow 31 in the direction of another side wall 26. The first and second portions may or may not be mutually exclusive with respect to the longitudinal flow 32. Therefore, it is possible for the first portion and the second portion to include the same portion of the original longitudinal flow 32, in part or whole. It is likewise possible for the first portion to be comprised of fluid which is not in the second portion or the second portion to be comprised of fluid which is not in the first portion. The lateral flow 31 and the outward flow 30 are perpendicularly disposed to one another and to the longitudinal flow 32. The outward flow 30 and the lateral flow(s) 31 cooperate to maintain separation between the piston ring 3 and each of the forward mating ring 4 and the aft mating ring 5. In preferred embodiments, separation is maintained when the fluid pressure about the piston ring 3 is greater than pressure at the higher pressure side adjacent to the seal assembly.

In some embodiments, at least one lateral flow 31 and the outward flow 30 converge when at least one side shoulder 27 intersects a base shoulder 25 such that side shoulder(s) 27 and base shoulder 25 are aligned along a plane that intersects the hydrodynamic groove 18. The convergence between outward and lateral flows 30, 31 cooperate to enhance the stiffness of the resultant thin film 36, at least in part, along the interface between each of the piston ring 3 and the sealing face 11 and the piston ring 3 and the sealing face 12. In other embodiments, at least one lateral flow 31 is formed downstream from an outward flow 30 or at least one lateral flow 31 is formed upstream from an outward flow 30. In yet other embodiments, it is possible for a pair of opposed lateral flows 31 to converge when a pair of side shoulders 27 are aligned along a common plane that intersects the hydrodynamic groove 18 such that the convergence enhances the stiffness of the resultant thin film 36 at least in part. In still other embodiments, the lateral flow 31 formed by one side shoulder 27 may be directed to impinge another side wall 26 such that the impingement enhances the stiffness of the resultant thin film 36 at least in part.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A method for forming a thin film between a piston ring of an intershaft sealing assembly and a sealing face along each of a forward mating ring and an aft mating ring comprising the steps of:
   (a) communicating a source flow into a feed groove communicable with a hydrodynamic groove, said feed groove biased toward an inner shaft, a plurality of said hydrodynamic grooves disposed along said sealing face of each of said forward mating ring and said aft mating ring between said inner shaft and an outer shaft;
   (b) establishing a longitudinal flow along said hydrodynamic groove after said source flow enters said hydrodynamic groove;
   (c) redirecting a first portion of said longitudinal flow via interaction with a base shoulder defined by and interposed between a pair of base walls to form an outward flow in direction of said piston ring and adjacent to said base shoulder, said base walls disposed between a pair of side walls, adjoining said base walls arranged along said hydrodynamic groove to decrease depthwise downstream from said feed groove; and
   (d) redirecting a second portion of said longitudinal flow via interaction with a side shoulder along at least one said side wall to form a lateral flow in direction of another said side wall, said side shoulder(s) arranged to decrease said hydrodynamic groove widthwise downstream from said feed groove, said lateral flow(s) and said outward flow perpendicularly disposed to one another and to said longitudinal flow, said outward flow and said lateral flow(s) cooperate to maintain separation between said piston ring and each of said forward mating ring and said aft mating ring.

2. The method of claim 1, further comprising the step of:
(e) converging said lateral flow(s) with said outward flow when said side shoulder(s) intersects said base shoulder along a plane that intersects said hydrodynamic groove, said converging step enhances a stiffness of said thin film.

3. The method of claim 1, wherein said lateral flow(s) formed downstream from said outward flow.

4. The method of claim 1, wherein said lateral flow(s) formed upstream from said outward flow.

5. The method of claim 1, further comprising the step of:
(e) converging said lateral flow from one said side wall with said lateral flow from another said side wall when said side shoulders are disposed in an opposed arrangement and said side shoulders are aligned along a plane that intersects said hydrodynamic groove, said converging step enhances a stiffness of said thin film.

6. The method of claim 1, further comprising the step of:
(e) impinging one said side wall by said lateral flow formed by said side shoulder along another said side wall, said impinging step enhances a stiffness of said thin film.

7. The method of claim 1, wherein said base shoulder reduces a local volume along said hydrodynamic groove which increases an effective local pressure of a fluid downstream from said base shoulder which improves a stiffness of said thin film formed by said fluid downstream from said base shoulder.

8. The method of claim 1, wherein said side shoulder reduces a local volume along said hydrodynamic groove which increases an effective local pressure of a fluid downstream from said side shoulder which improves a stiffness of said thin film formed by said fluid downstream from said side shoulder.

9. The method of claim 1, wherein said base shoulder and said side shoulder reduce a local volume along said hydrodynamic groove which increases an effective local pressure of a fluid downstream from said base shoulder and said side shoulder which improves a stiffness of said thin film formed by said fluid downstream from said base shoulder and said side shoulder.

10. An intershaft seal assembly disposed between an outer shaft and an inner shaft for sealing between a higher pressure side and a lower pressure side comprising:
(a) a piston ring disposed between a forward mating ring and an aft mating ring, said piston ring rotatable with said outer shaft, said forward mating ring and said aft mating ring rotatable with said inner shaft; and
(b) a plurality of hydrodynamic grooves disposed along a sealing face of each of said forward mating ring and said aft mating ring, a feed groove biased toward said inner shaft which directs a fluid into said hydrodynamic groove;
wherein:
each said hydrodynamic groove includes at least two adjoining steps wherein each said step is defined by a base wall, said base walls arranged along said hydrodynamic groove to decrease depthwise in direction opposite to rotation of said inner shaft, two adjoining said base walls disposed about a base shoulder, each said base shoulder locally redirects a longitudinal flow within said hydrodynamic groove to form an outward flow in direction of said piston ring;
said base walls bounded by and intersecting a pair of side walls, each said side wall includes at least one side shoulder which narrows said hydrodynamic groove widthwise and locally redirects said longitudinal flow away from said side wall to form a lateral flow in direction of another said side wall;
two said side shoulders intersect one said base shoulder so that said side shoulders are disposed in an opposed arrangement;
said outward flow(s) and said lateral flows cooperate to maintain separation between said piston ring and each of said forward mating ring and said aft mating ring.

11. The intershaft seal assembly of claim 10, wherein a depth of each of two said side shoulders are equal.

12. The intershaft seal assembly of claim 10, wherein a depth of each of two said side shoulders differ.

13. The intershaft seal assembly of claim 10, wherein a depth of each of one said side shoulder and one said base shoulder differ.

14. The intershaft seal assembly of claim 10, wherein a depth of each of one said side shoulder and one said base shoulder are equal.

15. The intershaft seal assembly of claim 10, wherein at least one said base wall is tapered.

16. The intershaft seal assembly of claim 10, wherein at least one said side wall is tapered.

17. The intershaft seal assembly of claim 10, wherein said base walls and said side walls are tapered.

18. An intershaft seal assembly disposed between an outer shaft and an inner shaft for sealing between a higher pressure side and a lower pressure side comprising:
(a) a piston ring disposed between a forward mating ring and an aft mating ring, said piston ring rotatable with said outer shaft, said forward mating ring and said aft mating ring rotatable with said inner shaft; and
(b) a plurality of hydrodynamic grooves disposed along a sealing face of each of said forward mating ring and said aft mating ring, a feed groove biased toward said inner shaft which directs a fluid into said hydrodynamic groove;
wherein:
each said hydrodynamic groove includes at least two adjoining steps wherein each said step is defined by a base wall, said base walls arranged along said hydrodynamic groove to decrease depthwise in direction opposite to rotation of said inner shaft, two adjoining said base walls disposed about a base shoulder, each said base shoulder locally redirects a longitudinal flow within said hydrodynamic groove to form an outward flow in direction of said piston ring;
said base walls bounded by and intersecting a pair of side walls, each said side wall includes at least one side shoulder which narrows said hydrodynamic groove widthwise and locally redirects said longitudinal flow away from said side wall to form a lateral flow in direction of another said side wall;
two said side shoulders are offset from one said base shoulder so that said side shoulders are disposed in an opposed arrangement;

said outward flow(s) and said lateral flows cooperate to maintain separation between said piston ring and each of said forward mating ring and said aft mating ring.

19. The intershaft seal assembly of claim 18, wherein a depth of each of two said side shoulders are equal.

20. The intershaft seal assembly of claim 18, wherein a depth of each of two said side shoulders differ.

21. The intershaft seal assembly of claim 18, wherein a depth of each of one said side shoulder and one said base shoulder differ.

22. The intershaft seal assembly of claim 18, wherein a depth of each of one said side shoulder and one said base shoulder are equal.

23. The intershaft seal assembly of claim 18, wherein at least one said base wall is tapered.

24. The intershaft seal assembly of claim 18, wherein at least one said side wall is tapered.

25. The intershaft seal assembly of claim 18, wherein said base walls and said side walls are tapered.

26. An intershaft seal assembly disposed between an outer shaft and an inner shaft for sealing between a higher pressure side and a lower pressure side comprising:
(a) a piston ring disposed between a forward mating ring and an aft mating ring, said piston ring rotatable with said outer shaft, said forward mating ring and said aft mating ring rotatable with said inner shaft; and
(b) a plurality of hydrodynamic grooves disposed along a sealing face of each of said forward mating ring and said aft mating ring, a feed groove biased toward said inner shaft which directs a fluid into said hydrodynamic groove;
wherein:
each said hydrodynamic groove includes at least two adjoining steps wherein each said step is defined by a base wall, said base walls arranged along said hydrodynamic groove to decrease depthwise in direction opposite to rotation of said inner shaft, two adjoining said base walls disposed about a base shoulder, each said base shoulder locally redirects a longitudinal flow within said hydrodynamic groove to form an outward flow in direction of said piston ring;
said base walls bounded by and intersecting a pair of side walls, each said side wall includes at least one side shoulder which narrows said hydrodynamic groove widthwise and locally redirects said longitudinal flow away from said side wall to form a lateral flow in direction of another said side wall;
two said side shoulders are offset from one said base shoulder so that said side shoulders are disposed in an offset arrangement;
said outward flow(s) and said lateral flows cooperate to maintain separation between said piston ring and each of said forward mating ring and said aft mating ring.

27. The intershaft seal assembly of claim 26, wherein a depth of each of two said side shoulders are equal.

28. The intershaft seal assembly of claim 26, wherein a depth of each of two said side shoulders differ.

29. The intershaft seal assembly of claim 26, wherein a depth of each of one said side shoulder and one said base shoulder differ.

30. The intershaft seal assembly of claim 26, wherein a depth of each of one said side shoulder and one said base shoulder are equal.

31. The intershaft seal assembly of claim 26, wherein at least one said base wall is tapered.

32. The intershaft seal assembly of claim 26, wherein at least one said side wall is tapered.

33. The intershaft seal assembly of claim 26, wherein said base walls and said side walls are tapered.

34. An intershaft seal assembly disposed between an outer shaft and an inner shaft for sealing between a higher pressure side and a lower pressure side comprising:
(a) a piston ring disposed between a forward mating ring and an aft mating ring, said piston ring rotatable with said outer shaft, said forward mating ring and said aft mating ring rotatable with said inner shaft; and
(b) a plurality of hydrodynamic grooves disposed along a sealing face of each of said forward mating ring and said aft mating ring, a feed groove biased toward said inner shaft which directs a fluid into said hydrodynamic groove;
wherein:
each said hydrodynamic groove includes at least two adjoining steps wherein each said step is defined by a base wall, said base walls arranged along said hydrodynamic groove to decrease depthwise in direction opposite to rotation of said inner shaft, two adjoining said base walls disposed about a base shoulder, each said base shoulder locally redirects a longitudinal flow within said hydrodynamic groove to form an outward flow in direction of said piston ring;
said base walls bounded by and intersecting a pair of side walls, each said side wall includes at least one side shoulder which narrows said hydrodynamic groove widthwise and locally redirects said longitudinal flow away from said side wall to form a lateral flow in direction of another said side wall;
one said side shoulder intersects one said base shoulder and another said side shoulder disposed in an offset arrangement with respect to said side shoulder which intersects said base shoulder;
said outward flow(s) and said lateral flows cooperate to maintain separation between said piston ring and each of said forward mating ring and said aft mating ring.

35. The intershaft seal assembly of claim 34, wherein a depth of each of two said side shoulders are equal.

36. The intershaft seal assembly of claim 34, wherein a depth of each of two said side shoulders differ.

37. The intershaft seal assembly of claim 34, wherein a depth of each of one said side shoulder and one said base shoulder differ.

38. The intershaft seal assembly of claim 34, wherein a depth of each of one said side shoulder and one said base shoulder are equal.

39. The intershaft seal assembly of claim 34, wherein at least one said base wall is tapered.

40. The intershaft seal assembly of claim 34, wherein at least one said side wall is tapered.

41. The intershaft seal assembly of claim 34, wherein said base walls and said side walls are tapered.

42. An intershaft seal assembly disposed between an outer shaft and an inner shaft for sealing between a higher pressure side and a lower pressure side comprising:
(a) a piston ring disposed between a forward mating ring and an aft mating ring, said piston ring rotatable with said outer shaft, said forward mating ring and said aft mating ring rotatable with said inner shaft; and (b) a plurality of hydrodynamic grooves disposed along a sealing face of each of said forward mating ring and said aft mating ring, a feed groove biased toward said inner shaft which directs a fluid into said hydrodynamic groove;

wherein:

each said hydrodynamic groove includes at least two adjoining steps wherein each said step is defined by a base wall, said base walls arranged along said hydrodynamic groove to decrease depthwise in direction opposite to rotation of said inner shaft, two adjoining said base walls disposed about a base shoulder, each said base shoulder locally redirects a longitudinal flow within said hydrodynamic groove to form an outward flow in direction of said piston ring;

said base walls bounded by and intersecting a pair of side walls, each said side wall includes at least one side shoulder which narrows said hydrodynamic groove widthwise and locally redirects said longitudinal flow away from said side wall to form a lateral flow in direction of another said side wall;

two said side shoulders are separately disposed about a base shoulder and arranged in an offset arrangement;

said outward flow(s) and said lateral flows cooperate to maintain separation between said piston ring and each of said forward mating ring and said aft mating ring.

43. The intershaft seal assembly of claim 42, wherein a depth of each of two said side shoulders are equal.

44. The intershaft seal assembly of claim 42, wherein a depth of each of two said side shoulders differ.

45. The intershaft seal assembly of claim 42, wherein a depth of each of one said side shoulder and one said base shoulder differ.

46. The intershaft seal assembly of claim 42, wherein a depth of each of one said side shoulder and one said base shoulder are equal.

47. The intershaft seal assembly of claim 42, wherein at least one said base wall is tapered.

48. The intershaft seal assembly of claim 42, wherein at least one said side wall is tapered.

49. The intershaft seal assembly of claim 42, wherein said base walls and said side walls are tapered.

* * * * *